United States Patent [19]
Morihara et al.

[11] Patent Number: 5,649,405
[45] Date of Patent: Jul. 22, 1997

[54] WEATHER STRIP

[75] Inventors: Yasuhiro Morihara; Hiroaki Fujisawa, both of Hiroshima, Japan

[73] Assignee: Nishikawa Rubber Co., Ltd., Hiroshima-ken, Japan

[21] Appl. No.: 591,982

[22] Filed: Jan. 29, 1996

[30] Foreign Application Priority Data

Feb. 16, 1995 [JP] Japan ................................. 7-053499

[51] Int. Cl.$^6$ ................................................ E04C 2/38
[52] U.S. Cl. ................. 52/716.1; 52/716.5; 52/716.6; 52/717.01; 52/717.03; 52/717.04; 52/717.05; 49/483.1; 49/489.1; 49/490.1; 296/146.2; 296/146.9
[58] Field of Search .................... 52/716.1, 716.5, 52/716.6, 716.7, 717.01, 717.03, 717.04, 717.05; 296/146.2, 146.9; 49/483.1, 489.1, 490.1

[56] References Cited

U.S. PATENT DOCUMENTS

| | | | |
|---|---|---|---|
| 4,819,381 | 4/1989 | Kitaura et al. | 49/489.1 X |
| 4,969,295 | 11/1990 | Nishikawa et al. | 296/146.2 X |
| 5,007,202 | 4/1991 | Guillon | 49/489.1 X |
| 5,367,830 | 11/1994 | Omura et al. | 49/489.1 X |

Primary Examiner—Christopher T. Kent
Attorney, Agent, or Firm—Flynn, Thiel, Boutell & Tanis, P.C.

[57] ABSTRACT

A weather strip is made up of a base for engaging with a door sash by way of a retainer, a hollow seal and a seal lip integrally connected to an indoor side and an outdoor side of the base respectively, the hollow seal and the seal lip elastically contacting an edge portion of a body panel opening edge, and a main solid rubber portion formed in an outer side pillar portion of the hollow seal, wherein an auxiliary solid rubber portion is formed in an outer side projection portion of the base, with a sponge rubber portion provided between the main solid rubber portion and the auxiliary solid rubber portion. As a result, it is possible to provide a weather strip having excellent inserting performance into the retainer.

3 Claims, 5 Drawing Sheets

WEATHER STRIP

BACKGROUND OF THE INVENTION

1. Field of the Invention

The present invention relates to a weather strip to be attached to a door sash and elastically contacted with an edge portion of a body panel opening edge for sealing a joint between the door sash and the edge portion of the body panel opening edge.

2. Prior Art

As shown in FIGS. 1 to 4, as a conventional weather strip to be attached to a door sash and elastically contacted to an edge portion of a body panel opening edge for sealing a joint between the door sash and the edge portion of the body panel opening edge, there is employed a weather strip 1a or 1b respectively comprising a base 2a or 2b for engaging with a door sash 21 by way of a retainer 9, a hollow seal 7 and a seal lip 8 which are respectively integrally connected to an indoor side 25 and an outdoor side 26 of the base 2a or 2b for elastically contacting an edge portion of a body panel opening edge 10, wherein a solid rubber portion T is formed in an outer side pillar portion of the hollow seal 7 to particularly improve workability for engaging the base 2a or 2b with the retainer 9 as shown in FIG. 2.

However, the weather strip 1a shown in FIG. 2, like the aforementioned conventional weather strip 1b, has a problem that outer side projection portion 2e, of the base 2a, is formed of a sponge rubber S and caught by a projection portion 9a of the retainer 9 so that the base 2a cannot engage with the retainer 9 completely as shown in FIG. 3. To prevent such a problem from occurring, a solid rubber portion T is provided at the outdoor side of the base 2b. However, this time, it develops a problem that it is necessary to increase the force necessary for insertion since the solid rubber portion T is less liable to bend.

Problems to be solved by the invention are as follows.

In the aforementioned conventional weather strips 1a and 1b, the outer side projection portion 2e formed of the sponge rubber S is caught by the projection portion 9a of the retainer 9 so that it is difficult to engage the base 2a with the retainer 9 completely. The weather strip in which the solid rubber portion T is provided at the outdoor side of the base 2b to prevent such problem from occurring has a drawback in that it is necessary to increase the force necessary for insertion since the solid rubber portion T is less liable to bend.

SUMMARY OF THE INVENTION

Accordingly, it is an object of the present invention to overcome the aforementioned drawbacks of the conventional weather strip and to provide a weather strip having excellent inserting performance.

The present invention will be now described with reference to FIG. 1 and FIGS. 5 to 9.

A weather strip according to a first aspect of the invention comprises a base 2c for engaging with a door sash 21 by way of a retainer 9, a hollow seal 7 integrally connected to an indoor side 25 of the base 2c, a seal lip 8 integrally connected to an outdoor side 26 of the base 2c, the hollow seal 7 and the seal lip 8 elastically contacting the edge portion 11 of the body panel opening edge 10, wherein a main solid rubber portion Tc is formed in an outer side pillar portion of the hollow seal 7 and, particularly, an auxiliary solid rubber portion Td is formed in an outer side projection portion 2e of the base 2c, with a sponge rubber portion S provided between the main solid rubber portion Tc and the auxiliary solid rubber portion Td.

A weather strip according to a second aspect of the invention further comprises a thin solid rubber portion Te formed along an outer surface of the hollow seal 7 to connect the main solid rubber portion Tc and the auxiliary solid rubber portion Td with each other, adding to the same elements as the first aspect of the invention.

DESCRIPTION OF THE PREFERRED EMBODIMENTS

Figure 5:
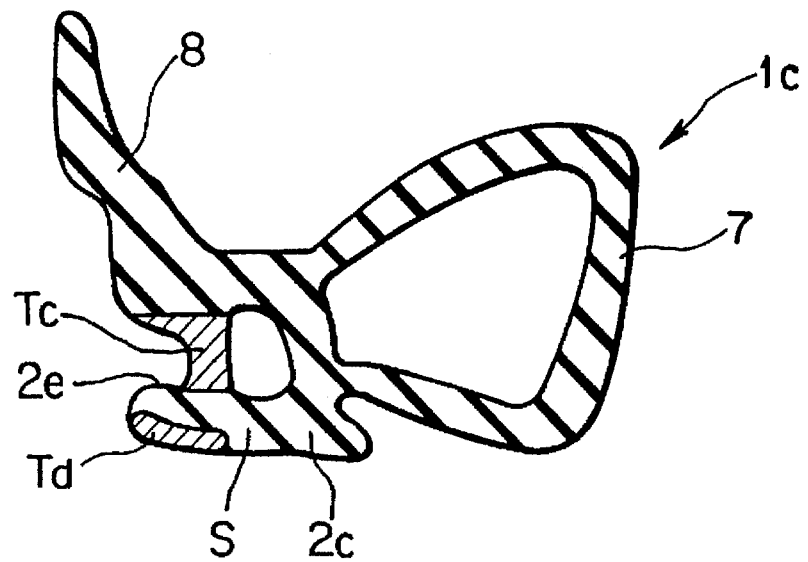
FIG. 5 is a cross-sectional view of a weather strip taken along a line P—P or Q—Q in FIG. 1 according to a first embodiment of the invention.
Figure 6:
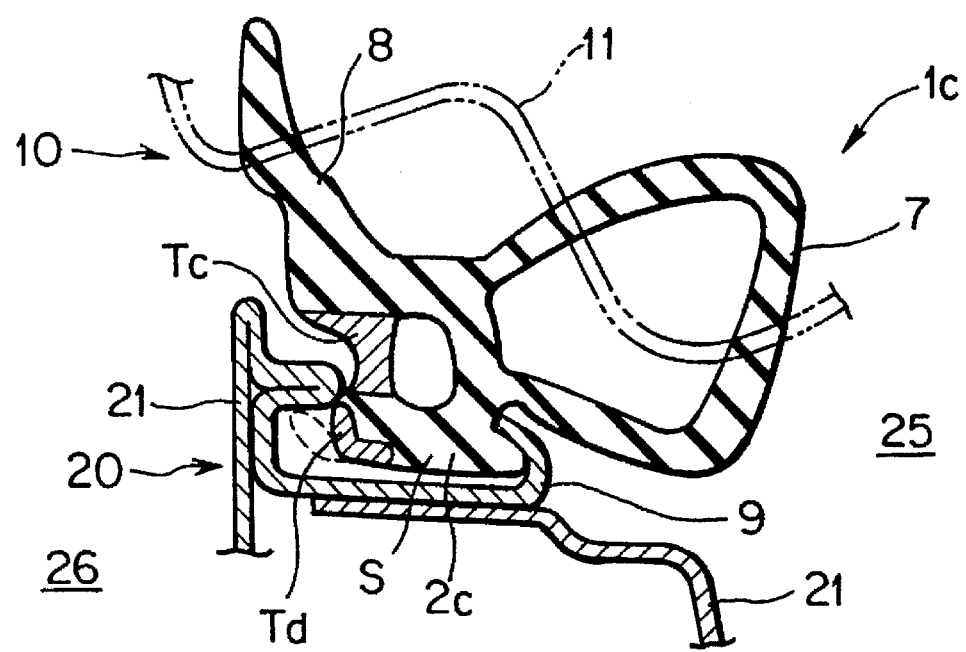
FIG. 6 is a view showing an inserting performance into a door sash of the weather strip according to the first embodiment of the invention.
Figure 7:
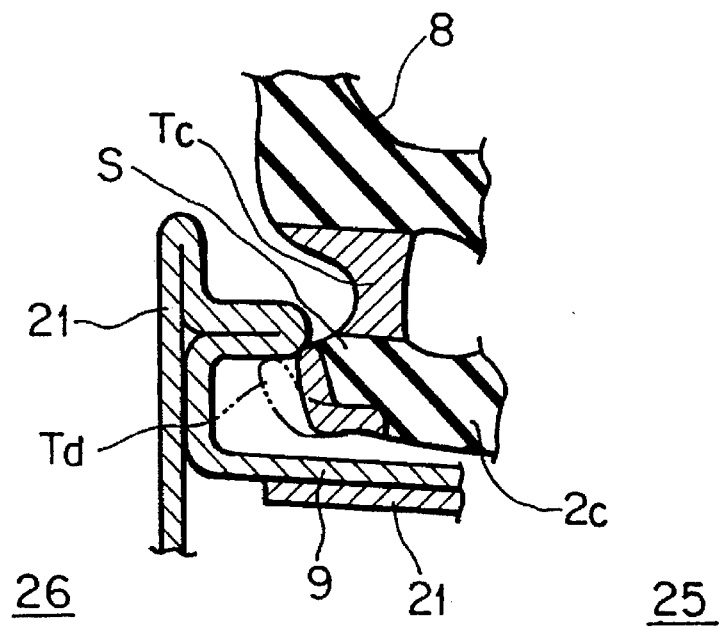
FIG. 7 is an enlarged view of a main portion of the weather strip of FIG. 6.

First Embodiment (FIGS. 5 to 7);

A first embodiment of the present invention will be now described with reference to FIGS. 5 to 7.

Denoted at 10 is a body panel opening edge, 11 is an edge portion of the body panel opening edge 10 between a front pillar and a rear pillar, 20 is a door, 21 is a door sash, 9 is a retainer attached to the door sash 21, 1c is a weather strip for sealing a joint between the edge portion 11 and the door sash 21 and it has the following structure. Denoted at 2c is a base for engaging with the retainer 9, and 7 and 8 are a hollow seal and a seal lip integrally connected to the base 2c at the indoor side 25 and the indoor side 25, respectively, for elastically contacting a lower surface of the edge portion 11. Denoted at Tc is a main solid rubber portion which is formed in a pillar portion at the outdoor side 26 of the hollow seal 7. Td is an auxiliary solid rubber portion which is formed in an outer side projection portion 2e of the base 2c, with a sponge rubber portion S provided between the main solid rubber portion Tc and the auxiliary solid rubber portion Td.

Figure 8:
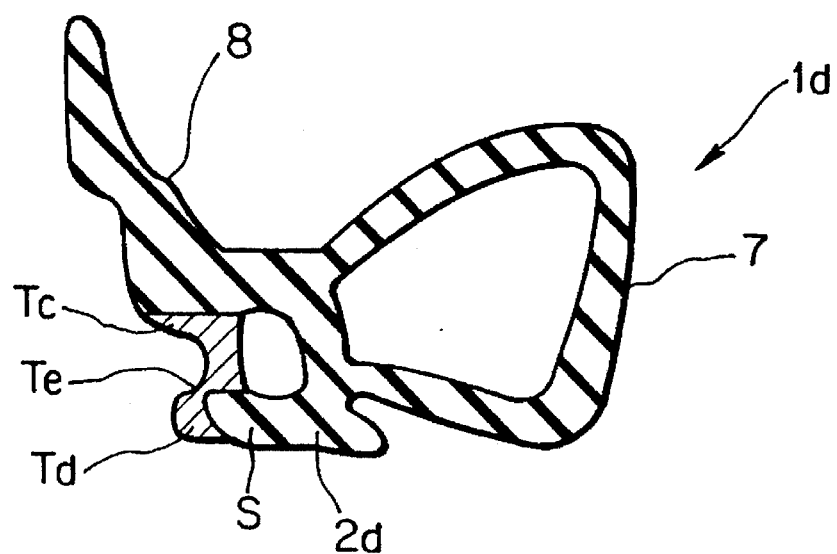
FIG. 8 is a cross-sectional view of a weather strip taken along a line P—P or Q—Q in FIG. 1 according to a second embodiment of the invention.
Figure 9:
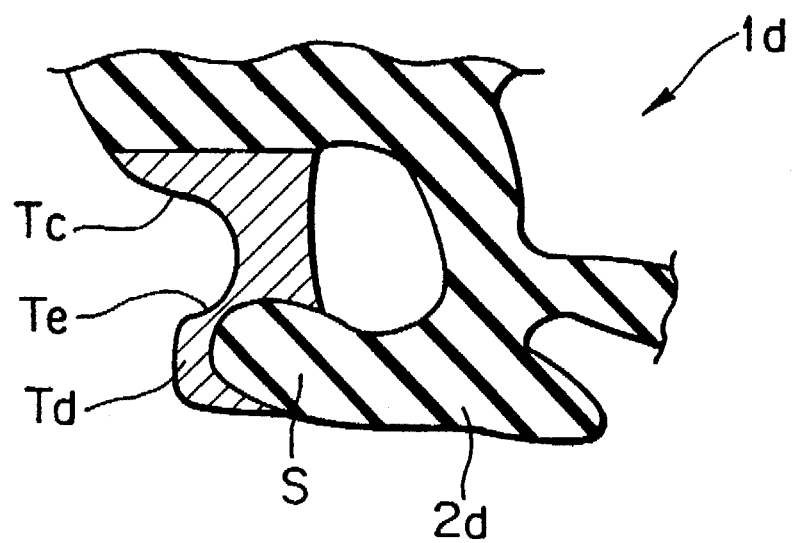
FIG. 9 is an enlarged view of a main portion of the weather strip of FIG. 8.

Second Embodiment (FIGS. 8 and 9);

A second embodiment of the present invention will be now described with reference to FIGS. 8 and 9.

A weather strip according to the second embodiment has the same structure as the weather strip according to the first embodiment except that the main solid rubber portion Tc and the auxiliary solid rubber portion Td are connected by way of a thin solid rubber portion Te formed along an outer surface of hollow seal 7.

Figure 1:
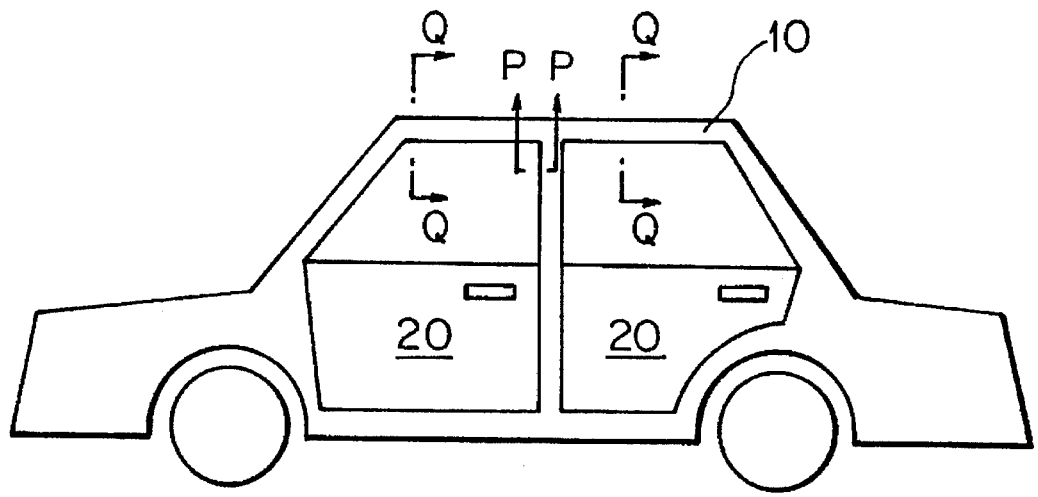
FIG. 1 is a side view of a vehicle.
Figure 2:
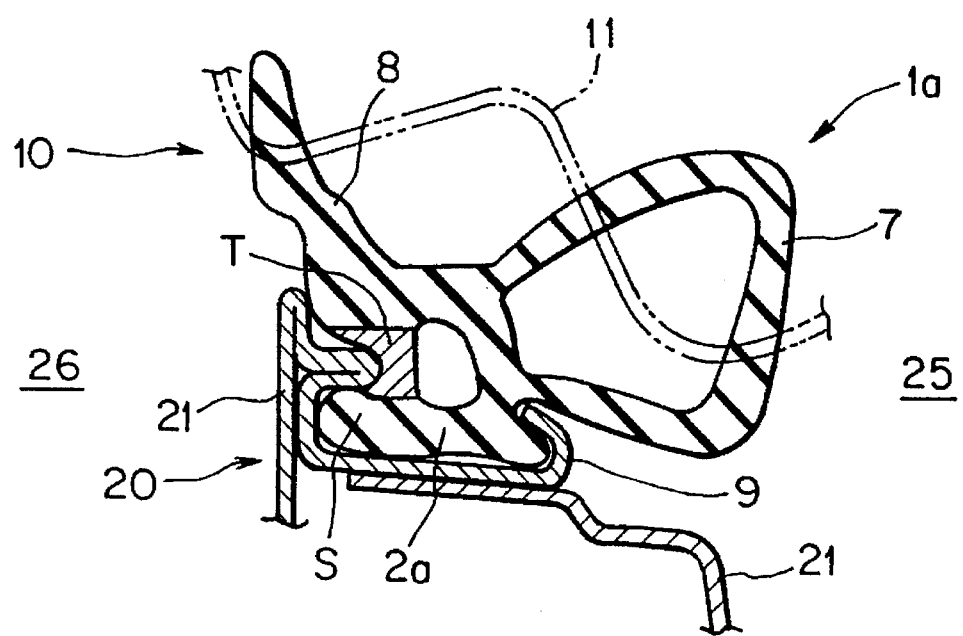
FIG. 2 is a cross-sectional view of a weather strip of a first prior art taken along a line P—P or Q—Q in FIG. 1.
Figure 3:
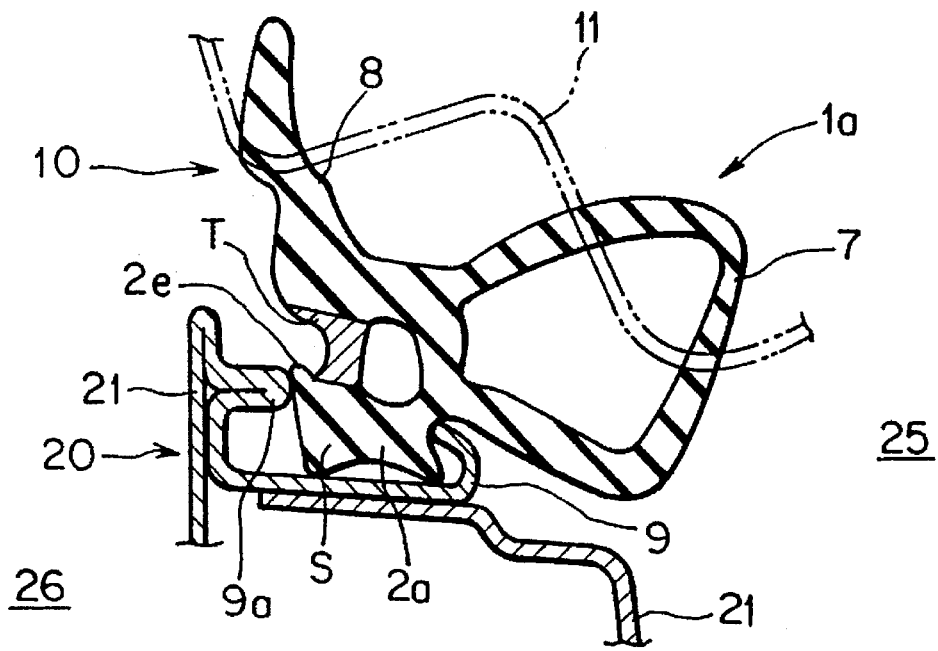
FIG. 3 is a view showing an inserting performance into a door sash of the first prior art weather strip of FIG. 2.
Figure 4:
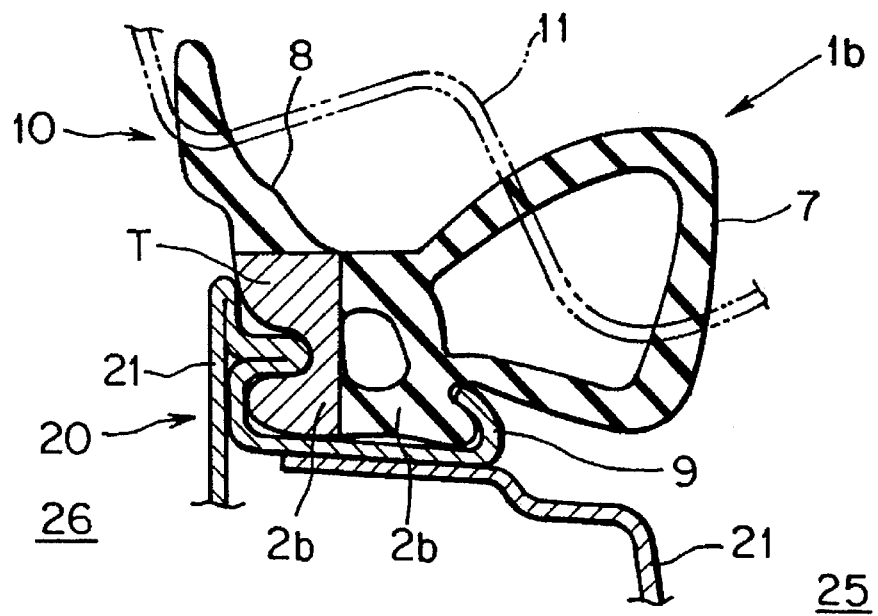
FIG. 4 is a cross-sectional view of a weather strip of a second prior art taken along a line P—P or Q—Q in FIG. 1.

Since the auxiliary solid rubber portion Td is formed in the outer side projection portion 2e of the base 2c or 2d in the weather strip according to the first or second embodiment of the invention respectively, that part increase in rigidity. As a result, when the weather strip is attached to the retainer 9, the outer side projection portion 2e is not bent to be caught by the projection portion 9a of the retainer 9, for example, as shown in FIG. 3. Further, at that time, the sponge rubber portion S and the thin solid rubber portion Te between the main solid rubber portion Tc and the auxiliary solid rubber portion Td tend to bend so that it is not necessary to increase the force necessary for inserting the weather strip into the retainer 9, which improves the inserting performance to the retainer 9 remarkably.

With the above arrangement of the present invention, the inserting performance of the weather strip can be improved without increasing the force for inserting the same into the retainer 9.

What is claimed is:

1. A weather strip for providing a seal between a door sash and a body panel opening edge, said weather strip comprising:

a base for engaging with a retainer of said door sash, said retainer comprising an inner member for engaging with an inner portion of said base and an outer member for engaging with an outer portion of said base, said base inner portion being formed of a sponge rubber and said base outer portion having a lower surface thereof formed of a solid rubber and an upper surface thereof formed of sponge rubber;

a hollow seal provided at an indoor side of said weather strip;

a seal lip provided at an outdoor side of said weather strip; and a solid rubber member connecting said seal lip and said upper surface of said base outer portion, wherein said hollow seal and said seal lip are adapted to elastically contact said body panel opening edge.

2. A weather strip for providing a seal between a door sash and a body panel opening edge, said weather strip comprising:

a base for engaging with a retainer of said door sash, said retainer comprising an inner member for engaging with an inner portion of said base and an outer member for engaging with an outer portion of said base, said base inner portion being formed of a sponge rubber and said base outer portion being formed of a solid rubber;

a hollow seal provided at an indoor side of said weather strip;

a seal lip provided at an outdoor side of said weather strip; and a solid rubber member connecting said seal lip and said base outer portion, wherein said hollow seal and said seal lip are adapted to elastically contact said body panel opening edge.

3. The weather strip of claim 2, wherein said solid rubber member is integral with said base outer portion.

* * * * *